United States Patent
Bellasio et al.

[11] 3,900,515
[45] Aug. 19, 1975

[54] 2-ARYL-3-ISOPROPYLAMINO-1-BUTANOLS

[75] Inventors: Elvio Bellasio, Como; Franco Cristiani, Pavia, both of Italy

[73] Assignee: Gruppo Lepetit, S.p.A., Milan, Italy

[22] Filed: May 8, 1972

[21] Appl. No.: 251,037

[30] Foreign Application Priority Data
May 21, 1971 Italy.................................. 24389/71

[52] U.S. Cl......... 260/501.17; 260/469; 260/471 R; 260/4; 260/570.8 R; 260/556 AR; 260/570.5 R; 260/501.19; 260/574; 424/321; 424/330
[51] Int. Cl............................................. C07c 91/00
[58] Field of Search..... 260/566 R, 556 A, 570.5 R, 260/501.17, 570.8 R, 574, 501.19

[56] References Cited
UNITED STATES PATENTS
3,530,139  9/1970  Reeder et al................. 260/570.5 R
3,551,492  12/1970  Mizzoni et al. ................ 260/566 R
3,660,487  5/1972  Larson et al.................... 260/556 A FOREIGN PATENTS OR APPLICATIONS
1,261,862  2/1968  Germany OTHER PUBLICATIONS
Metzger et al., Chem. Ber., Vol. 101, pp. 1120–1130, (1968).

Fieser et al., Reagents for Organic Synthesis, John Whiley & Sons Inc., N.Y., pp. 584–585, (1967).

*Primary Examiner*—Howard T. Mars
*Assistant Examiner*—G. Breitenstein
*Attorney, Agent, or Firm*—Theodore Post; C. Kenneth Bjork

[57] ABSTRACT

2-Aryl-3-isopropylamino-1-butanols corresponding to the formula

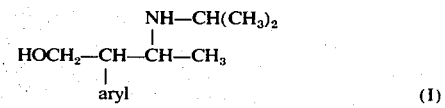

(I)

and their pharmaceutically acceptable acid salts. The compounds of the invention are crystalline solids or liquids which, having two asymmetric centers, can be obtained in their stereoisomeric forms as racemic mixtures or in optically active form. The compounds exhibit β-receptor activity as β-blocking agents and are therefore useful in the treatment of heart diseases such as angina pectoris and cardiac arrhythmias. The compounds are prepared by reacting a lower alkyl 2-aryl-3-isopropylamino-butyrate with acetone to form a Schiff base which is subsequently hydrogenated to the corresponding 2-aryl-3-isopropylamino-1-butanol.

7 Claims, No Drawings

2-ARYL-3-ISOPROPYLAMINO-1-BUTANOLS

SUMMARY OF THE INVENTION

This invention concerns 2-aryl-3-isopropylamino-1-butanols corresponding to the formula:

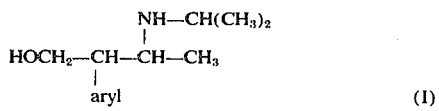

(I)

and the pharmaceutically acceptable acid salts. The terms "lower alkyl" and "lower alkoxy" as used in the specification and claims refer to alkyl and alkoxy groups of one to four carbon atoms; the term "aryl" refers to phenyl, substituted phenyl, naphthyl and substituted naphthyl groups wherein the substituents are selected from halo, lower alkyl, lower alkoxy, methylenedioxy, halo-lower alkyl, nitro, cyano, carbamyl, amino, lower acylamino, lower alkylsulfonamido and halo-lower alkyl-sulfonamido; and the term "lower acyl" refers to two to four carbon aliphatic acyl groups. A preferred group of compounds comprises those compounds of formula (I) where the term "aryl" is phenyl, mono- or dichloro-substituted phenyl, mono or dimethoxy substituted phenyl, nitrophenyl, aminophenyl, methansulfonamidophenyl or naphthyl. The compounds of the invention are crystalline solids or liquids which, having two asymmetric centers, can be obtained in their stereoisomeric forms as racemic mixtures or in optically active form. The compounds have been found to exhibit a high degree of activity on β-receptors. More particularly, they are β-blocking agents and are therefore useful in the treatment of heart diseases such as angina pectoris and cardiac arrhythmias. Their activity is associated with a low toxicity.

A general method for the preparation of the inventive compounds comprises the reaction of a lower alkyl 2-aryl-3-aminobutyrate with acetone to form a Schiff base which is hydrogenated to the corresponding 2-aryl-3-isopropylamino-1-butanol.

Suitable hydrogenating agents for the butyrate carboxyester group and the Schiff base imino double bond are selected from the group consisting of mixed metal hydrides and, in particular, lithium aluminum hydride has been found to be useful for this purpose.

The starting lower alkyl 2-aryl-3-aminobutyrates are obtained by reacting an ethanolic solution of a lower alkyl 2-arylcrotonate with excess ammonia at ca. 20° to ca. 60°C. at atmospheric or superatmospheric pressure. Since these intermediates may be isolated in their racemic stereoisomeric forms and in their optically active components, all the possible optical isomers of the compounds of formula (I) may be prepared. In some cases the stereoisomers are separated only at the last stages of the process, when the butyrates have been converted to alkylaminobutanols. The separation methods include all the usual techniques known such as, for example, fractional crystallization and column chromatography. The two stereoisomeric forms are conventionally indicated as α- or β-form, the α- form being the one derived from the erythro-3-aminobutyrates and the β-form being the one derived from the threo-3-aminobutyrates. When the steric conformation of the starting aminobutyrates has not been established, the final isomeric butanols have been assigned the α- or β-form depending on the nuclear magnetic resonance (nmr) chemical shift, expressed in τ units, due to the hydrogen atoms of the $C_4$-methyl group. The isomer which exhibits the higher value of the chemical shift is assigned the α-form. The aryl moiety of the inventive compounds may be further modified by introducing substituents like nitro, amino and alkylsulfonamido groups. In particular, when, in the compound of formula (I), the aryl group is phenyl, the isopropylamino and primary alcohol functions may be acylated and then, by treatment with concentrated nitric acid, the starting 2-phenyl-3-isopropylamino-1-butanol is transformed into the diacyl derivative of 2-(p-nitrophenyl)-3-isopropylamino-1-butanol. This compound may be deacylated by acid hydrolysis or utilized as such for further chemical transformation of the nitro group. Thus, catalytic hydrogenation leads to the corresponding p-aminophenyl derivative which in turn may be converted into the p-alkylsulfonamido analog by treatment with a suitable chlorosulfonylalkane. By a selective acid hydrolysis, the alcohol and the isopropylamino functions are deacylated giving 2-(p-alkylsulfonamido)-3-isopropylamino-1-butanol.

A preferred mode for carrying out the condensation reaction between acetone and the 3-aminobutyrate comprises refluxing one of the latter compounds with a large excess of acetone for several hours, in the presence of a molecular sieve such as a sodium aluminum silicate to remove water which forms during the reaction. The end product is easily recovered by filtering off the molecular sieve and evaporating the filtrate in vacuo. The crude material is generally used as such for the hydrogenation step. For this purpose, a suitable procedure is to dissolve one molecular proportion of the Schiff base in an inert organic solvent, add the resulting solution to a suspension of an excess of more than two molecular proportions of lithium aluminum hydride in an inert organic solvent and then reflux for several hours. In general, a very large excess of mixed metal hydride is preferable to expedite the reaction course. Recovery of the final product, a 2-aryl-3-isopropylamino-1-butanol, does not present any particular difficulty and comprises fractional distillation under vacuum or crystallization from suitable organic solvents such as lower alkanols, dialkyl ethers, esters or mixtures thereof.

The compounds of the present invention display marked β-blocking activity. Representative experiments in anesthesized rats and in conscious dogs showed $ED_{50}$ values, i.e., the amount of compound required to reach a 50 percent effect in antagonizing isopropylnoradrenaline-induced tachcardia and pressor response, ranging from about 0.1 to about 3 mg/kg i.v. The $LD_{50}$ values are generally higher than 300 mg/kg per os and 160 mg/kg i.p., respectively. A more detailed indication of the biological activity as to specific $ED_{50}$ and $LD_{50}$ values of representative compounds is given in the following table.

| Compound of Example | $ED_{50}$ in antagonizing the isoprenaline induced (0.2μg/kg. i.v.) | | $LD_{50}$ mg/kg (mice) |
|---|---|---|---|
| | positive inotropic effect mg/kg i.v. | hypotensive effect mg/kg i.v. | |
| 13(α-isomer) | 0.5 (dog) | 0.5 (dog) | >500 |
| 13(β-isomer) | 1.2 (dog) | 1.2 (dog) | >500 |

-Continued

| Compound of Example | ED₅₀ in antagonizing the isoprenaline induced (0.2μg/kg. i.v.) | | LD₅₀ mg/kg (mice) |
|---|---|---|---|
| | positive inotropic effect mg/kg i.v. | hypotensive effect mg/kg i.v. | |
| 2 | 1 (rat) | 1 (rat) | >500 |
| 6 | 0.5 (rat) | 0.5 (rat) | >500 |
| 14(α-isomer) | 2 (rat) | 2 (rat) | >500 |
| 8 | 0.2 (rat) | 0.1(rat) | 308 |

The inventive compounds can also be administered by mouth. For oral administration, they are compounded into suitable pharmaceutical forms, such as, for example, tablets or capsules. The dosage unit may contain the usual excipients such as, for example, starch, gums, fatty acids, sugars and other pharmaceutical carriers. The dosage range is from about 0.5 to about 5 mg/kg. of body weight per day, preferably administered in divided doses.

DESCRIPTION OF THE PREFERRED EMBODIMENTS

The present invention is further described by the following additional enabling and best mode embodiments, which are not limitative of the invention as claimed.

EXAMPLE 1: β-2-Phenyl-3-isopropylamino-1-butanol

83 Grams of ethyl threo-2-phenyl-3-aminobutyrate is refluxed for 15-17 hours in 700 ml. of anhydrous acetone in the presence of 90 g. of molecular sieve Type 4A-sodium aluminum silicate B.D.H. After filtration and washing of the molecular sieve with acetone, the solution is evaporated to dryness in vacuo. The resulting crude compound is dissolved in 2,200 ml. of anhydrous ethyl ether and, maintaining the temperature at about 0° to 5°C, the solution is added dropwise under stirring to a suspension of 44 g. of LiAlH₄ in 1,800 ml. of anhydrous ethyl ether. After refluxing for 8-10 hours and chilling to minus 10°C, 100 ml. of ethanol and then 250 ml. of water are added. The resulting inorganic precipitate is filtered off and the filtrate dried over sodium sulfate. After evaporation of the solvent, the residue is distilled under reduced pressure to give a yield of 68 g. of the title product, b.p. 118°C/0.4 mm Hg.

EXAMPLES 2 – 9

Following the same procedure as in Example 1, substituting the corresponding 2-aryl-3-aminobutyrate in place of the ethyl threo-2-phenyl-3-aminobutyrate, the following compounds are obtained:

2. α-2-phenyl 3-isopropylamino-1-butanol, boiling at 120°C/0.2 mm Hg, from ethyl erythro-2-phenyl-3-aminobutyrate;
3. α-2-(3,4-dimethoxyphenyl)-3-isopropylamino-1-butanol, boiling at 100° – 102°C, from ethyl erythro-2-(3,4-dimethoxyphenyl)-3-aminobutyrate;
4. α- and β-2-(3,4-dimethoxyphenyl)-3-isopropylaminobutyrate, boiling at 130°C/0.2 mm Hg, from ethyl 2-(3,4-dimethoxy)-3-aminobutyrate;
5. β-2-(3,4-dichlorophenyl)-3-isopropylamino-1-butanol maleic acid salt, melting at 150° – 151°C, from ethyl threo-2-(3,4-dichlorophenyl)-3-aminobutyrate;
6. (+)β-2-(3,4-dichlorophenyl)-3-isopropylamino-1-butanol maleic acid salt, melting at 133° – 137°C, from threo 2-(3,4-dichlorophenyl)-3-aminobutyrate;
7. (−)-threo-2-(3,4-dichlorophenyl)-3-isopropylamino-1-butanol maleic acid salt, melting at 137° – 140°C, from ethyl(−)-threo 2(3,4-dichlorophenyl)-3-aminobutyrate;
8. α-2-(3,4-dichlorophenyl)-3-isopropylamino-1-butanol hydrochloride, melting at 186° – 188°C, from ethyl erythro-2-(3,4-dichlorophenyl)-3-aminobutyrate;
9. α & β-2-(α-naphthyl)-3-isopropylamino-1-butanol, boiling at 140°C/0.2 mm Hg, from ethyl 2-(α-naphthyl)-3-aminobutyrate;

EXAMPLE 10: Separation of the optical isomers of ethyl threo -2-(3,4-dichlorophenyl)-3-aminobutyrate:
Ethyl (+)-threo-2-(3,4-dichlorophenyl)-3-aminobutyrate;
Ethyl (−)-threo-2-(3,4-dichlorophenyl)-3-aminobutyrate The title compounds, which are used as starting materials for preparing the compounds of Examples 6 and 7, are obtained in the following way. To a solution of 12.4 g. of ethyl threo-2-(3,4-dichlorophenyl)-3-aminobutyrate in 200 ml. of ethanol, 17.25 g. of (−)-dibenzoyltartaric acid monohydrate in 30 ml. of ethanol is added. After heating at about 45°C for 15 minutes, the solution is allowed to stand overnight and the resulting precipitate is recovered by filtration. A further crystallization from ethanol gives 13 g. of dibenzoyl tartrate of ethyl (−)-threo-2-(3,4-dichlorophenyl)-3-aminobutyrate. M.p. 188° – 189°C; $[\alpha]_D^{20}$ −103.5 (c = 0.987% in methanol).

The free base is obtained by treatment with aqueous dilute sodium hydroxide and extraction with ethyl ether; $[\alpha]_D^{20}$ −35.5 (= 0.987% in methanol). The other optical isomer, ethyl (+)-threo-2-(3,4-dichlorophenyl)-3-aminobutyrate is obtained by evaporating the mother liquors of the first crystallization of the dibenzoyltartrates, recrystallizing the residue from ethanol and setting free the base in the usual way; $[\alpha]_D^{20}$ +34.8 (c = 0.949% in methanol).

EXAMPLE 11:
α-2-Phenyl-3-(N-acetyl-isopropylamino)-1-butanol acetate;
β-2-Phenyl-3-(N-acetyl-isopropylamino)-1-butanol acetate 5 Grams of β-2-phenyl-3-isopropylamino-1-butanol is refluxed with an excess (150 ml.) of acetic anhydride. After removing the excess of acetic anhydride in vacuo the residue is taken up with water and then extracted with ether. The solution, after evaporation of the solvent gives β-2-phenyl-3-(N-acetyl-isopropylamino)-1-butanol acetate which boils at 135° – 6°C/0.2 mm Hg.

α-2-Phenyl-3-(N-acetyl-isopropylamino)-1-butanol acetate is obtained by following the same procedure, but utilizing as a starting material α-2-phenyl-3-isopropylamino-1-butanol. It boils at 140°C/0.2 mm Hg.

EXAMPLE 12:
α-2-(p-Nitrophenyl)-3-isopropylamino-1-butanol hydrochloride;
β-2-(p-Nitrophenyl)-3-isopropylamino-1-butanol hydrochloride 64.7 Grams of β-2-phenyl-3-(N-acetyl-isopropylamino)-1-butanol acetate is added dropwise to 750 ml. of concentrated nitric acid at about −40°C. The mixture is maintained under stirring for 40 minutes and then poured into ice. After neutralization with solid sodium bicarbonate and extraction with ethyl ether, the organic layer is dried over sodium sulfate and then evaporated to dryness. The residue is refluxed for 5 hours with 700 ml. of aqueous 20% HCl and the cooled solution is washed with ethyl ether. The aqueous layer is evaporated in vacuo and the residue is dissolved in 200 ml. of acetone. After concentration of the solution to about 50 ml., 38 g. of β-2-(p-nitrophenyl)-3-isopropylamino-1-butanol hydrochloride is recovered by filtration. It melts at 215°C. Using the same procedure, α-2-(p-nitrophenyl)-3-isopropylamino-1-butanol hydrochloride is obtained starting with α-2-phenyl-3-(N-acetyl-isopropylamino)-1-butanol acetate. It melts at 164° – 167°C.

EXAMPLE 13:
α-2-(p-Methylsulfamidophenyl)-3-isopropylamino-1-butanol hydrochloride;
β-2-(p-Methylsulfamidophenyl)-3-isopropylamino-1butanol hydrochloride The crude diacetyl derivatives of the compounds obtained as described in Example 12 may be used. Alternatively, the starting diacetyl derivative may be prepared as follows. 37 Grams of β-2-(p-nitrophenyl)-3-isopropylamino-1-butanol hydrochloride is treated with an excess of sodium bicarbonate suspended in water. The free base recovered by extraction with ethyl ether and evaporation of the solvent is heated with an excess of acetic anhydride (220 ml.) on a steam bath in the presence of a catalytic amount of pyridine. The diacetyl derivative of β-2-(p-nitrophenyl)-3-isopropylamino-1-butanol is recovered by evaporation of the acetic anhydride and then dissolved in 1,200 ml. of ethanol. This solution is hydrogenated with hydrogen at atmospheric pressure and room temperature, using 15 g. of palladiated charcoal as a catalyst. The ethanol solution is filtered and evaporated to dryness and the residue dissolved in a cooled aqueous 2% HCl solution which is then washed with ethyl ether. The aqueous layer is then alkalized to pH 8–9 and extracted with ethyl ether. The organic phase, after drying over sodium sulfate, is evaporated to dryness in vacuo. The residue is dissolved in 170 ml. of ethyl acetate, then, at about 0°C, 7.8 g. of triethylamine amine is added followed by 9.5 g. of methanesulfonyl chloride. The mixture is maintained at 0°C for 30 minutes and at room temperature for 6 hours. The solution is then washed with water, dried over sodium sulfate and evaporated to dryness in vacuo. The residue is crystallized from ethyl acetate, yielding 25 g. of β-2-(p-methylsulfonamidophenyl)-3-(N-acetyl-isopropylamino)-1-butanol acetate, which melts at 142°– 3°C.

7.7 Grams of this latter compound is refluxed for 3 hours with 64 ml. of aqueous 23% HCl. The residue, after evaporation of the solution, is crystallized from ethanol, giving 5.2 g. of β-2-(p-methylsulfonamidophenyl)-3-isopropylamino-1-butanol hydrochloride. M.p. 90° – 95°C. The α-isomer, similarly obtained according to the above described procedure, undergoes a physical transformation by heating at about 65° – 70°C and melts at 190° – 193°C. These compounds are highly hygroscopic.

EXAMPLE 14:
α-2-(p-Aminophenyl)-3-isopropylamino-1-butanol dihydrochloride;
β-2-(p-Aminophenyl)-3-isopropylamino-1-butanol 11 Grams of
β-2-(p-nitrophenyl)-3-isopropylamino-1-butanol in 400 ml. of ethanol is hydrogenated with hydrogen at atmospheric pressure using 6 g. of 10% palladiated charcoal as a catalyst. After filtering and evaporating the solution, the residue is distilled at 140°C/0.2 mm Hg. to give the β-isomer titular product. The α-isomer is similarly obtained. Its dihydrochloride, crystallized from methanol, melts at 230°C.

The arylcrotonate starting materials (for preparing the 2-aryl-3-aminobutyrate starting materials) are prepared according to the method of Bellasio et al., (Farmaco, Ed. Sci. Vol. 25, No. 6, 409, 1970) or in a more convenient way via a Wittig reaction between alkyl esters of arylglyoxylic acids and ethyltriphenylphosphonium halides in the presence of phenyllithium:

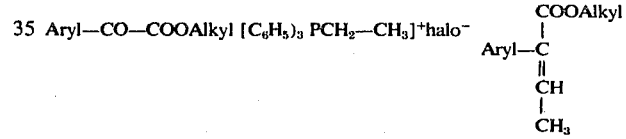

What is claimed is:

1. A 2-aryl-3-isopropylamino-1-butanol of the formula

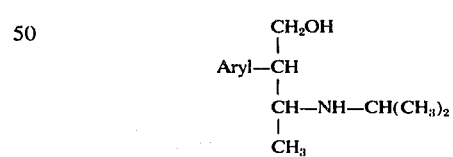

wherein aryl represents phenyl or substituted phenyl wherein the substituents are selected from dichloro, amino, and lower alkylsulfonamido; and a salt thereof with a pharmaceutically acceptable acid.

2. The compound of claim 1 which is α-2-phenyl-3-isopropylamino-1-butanol, b. p. 120°C./0.2 mm. Hg.

3. The compound of claim 1 which is (+)β-2-(3,4-dichlorophenyl)-3-isopropylamino-1-butanol maleate, m. p. 150°–151°C..

4. The compound of claim 1 which is α-2-(3,4-dichlorophenyl)-3-isopropylamino-1-butanol hydrochloride, m. p. 186°–188°C..

5. The compound of claim 1 which is a α-2-(p-methyl-sulfonamidophenyl)-3-isopropylamino-1-butanol hydrochloride, melting at 190°-193°C.

6. The compound of claim 1 which is β-2-(p-methyl-sulfonamidophenyl)-3-isopropylamino-1-butanol hydrochloride, melting at 90°-95°C.

7. The compound of claim 1 which is α-2-(p-aminophenyl)-3-isopropylamino-1-butanol dihydrochloride, m. p. 230°C..

* * * * *

UNITED STATES PATENT OFFICE
CERTIFICATE OF CORRECTION

PATENT NO. : 3,900,515
DATED : August 19, 1975
INVENTOR(S) : E. Bellasio, F. Cristiani It is certified that error appears in the above–identified patent and that said Letters Patent are hereby corrected as shown below:

Page 1, under foreign Application Priority Data, "May 21, 1971" should read --May 12, 1971--;

Column 4, line 41,"(=0.987% in methanol)" should read --(C=0.987% in methanol)--;

Column 5, line 31, "1butanol" should read --1-butanol--;

Column 5, line 55, delete "amine" after the word triethylamine;

Column 6, line 35,"$[C_6H_5)_3$" should read --$[(C_6H_5)_3$--;

Column 6, line 36, before word "Aryl" insert

———————————→

Signed and Sealed this

*twenty-third* Day *of December 1975*

[SEAL]

Attest:

RUTH C. MASON
*Attesting Officer*

C. MARSHALL DANN
*Commissioner of Patents and Trademarks*